UNITED STATES PATENT OFFICE.

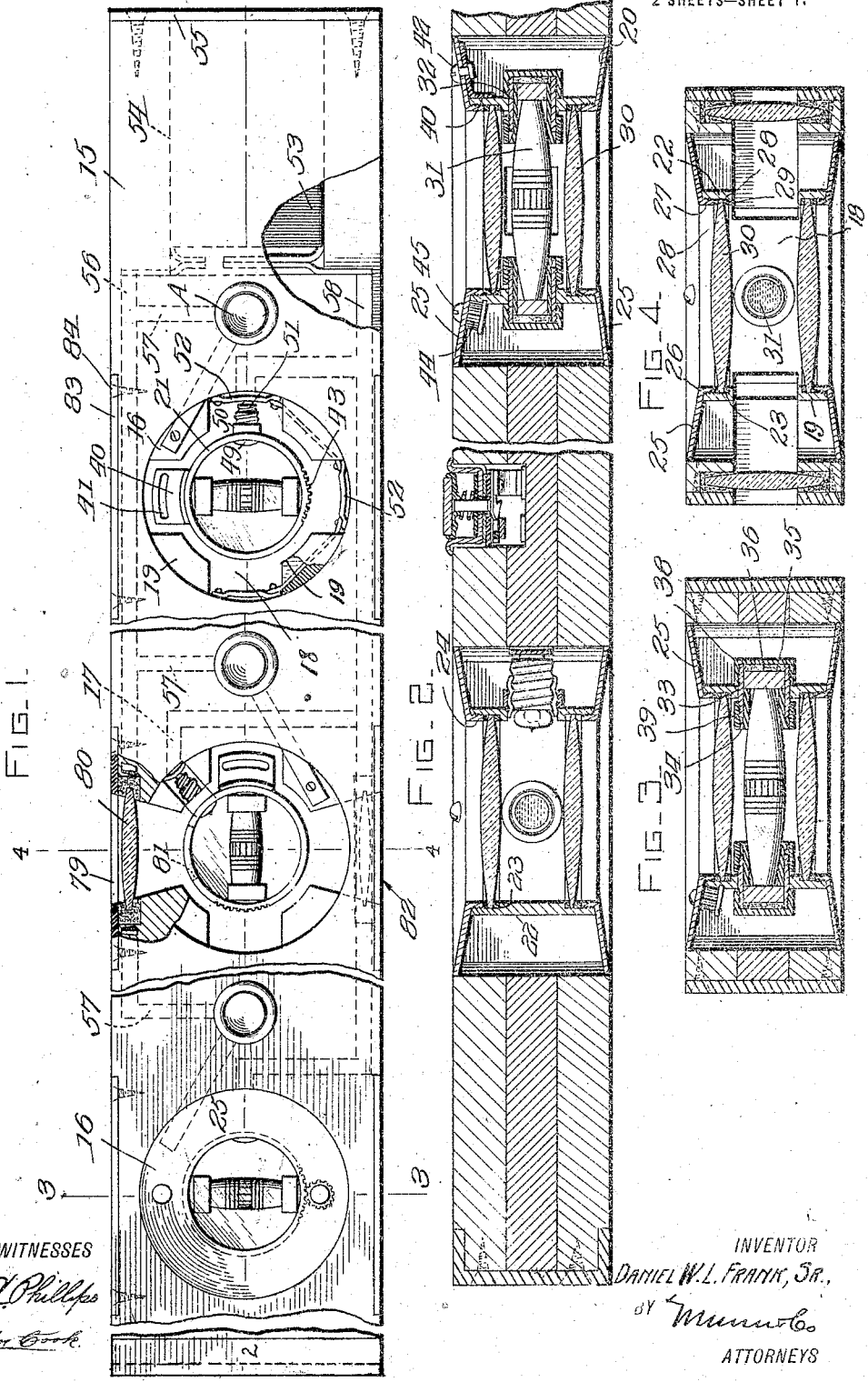

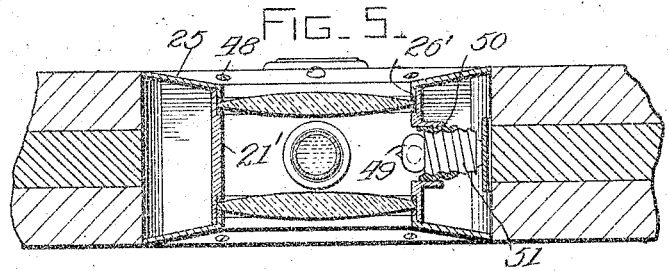
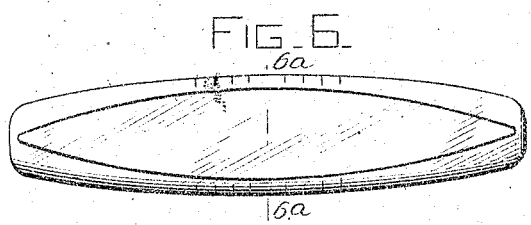
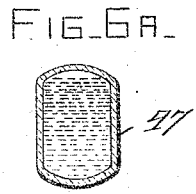
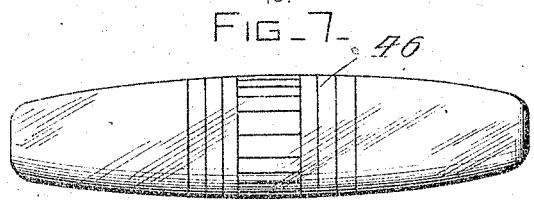
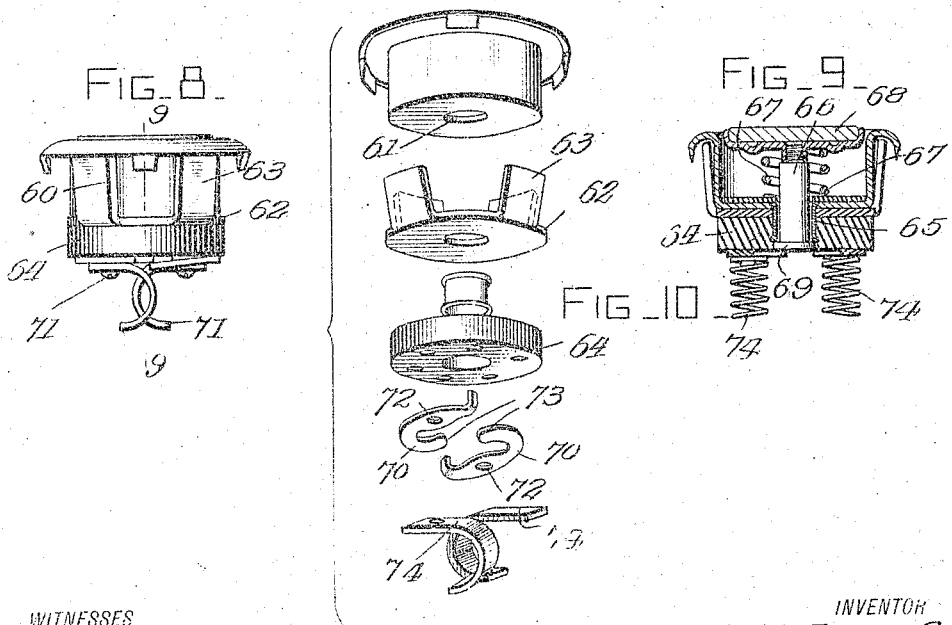

DANIEL W. L. FRANK, SR., OF CHICAGO, ILLINOIS.

LEVEL.

1,172,971.

Specification of Letters Patent. Patented Feb. 22, 1916.

Application filed October 6, 1914. Serial No. 865,231.

*To all whom it may concern:*

Be it known that I, DANIEL W. L. FRANK, Sr., a citizen of the United States, and resident of Chicago, in the county of Cook and State of Illinois, have made certain new and useful Improvements in Levels, of which the following is a specification.

This invention relates to leveling instruments and aims primarily to provide a level of the illuminated vial type with means whereby the vial may be adjusted from time to time so as to always indicate the true and correct reading.

A further object is to provide a leveling vial and mounting so arranged that it may be positioned either vertical or horizontal and adjusted through minute arcs in either position.

A further object is to provide a vial tube, the walls of which are symmetrical about and convexed with relation to the longitudinal median line and everywhere circular in transverse section, thus allowing the vial tube to be used in any nearly horizontal position and also allowing the vial tube to be read in a transverse direction which indicates the twist of the tube and thus the bevel or lateral inclination of any object.

A further object is to provide a vial tube support or mounting whereby the tube will be held securely and adjustably in place, protected from dust and dirt and against likelihood of injury and also providing for such expansion and contraction as met with during exposure to varying temperatures and climatic conditions.

Another object is to provide a level with a number of leveling devices incorporated therein which are electrically illuminated from a common source of energy or battery carried within the level body, the light being controlled by a novel form of push button or switch especially adapted for the purpose in hand.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a view in side elevation of my improved level, with parts thereof removed, and other parts broken away to more clearly disclose the structural features involved. Fig. 2 is a sectional view taken along the longitudinal line 2—2 of Fig. 1. Fig. 3 is a cross sectional view taken on the line 3—3 of Fig. 1. Fig. 4 is a cross sectional view taken on the line 4—4 of Fig. 1. Fig. 5 is a fragmental view in section illustrating a somewhat modified form of vial tube mounting and support. Fig. 6 is a modified form of vial tube. Fig. 6ª is a cross sectional view taken on the line 6ª—6ª of Fig. 6. Fig. 7 is a view in elevation of the preferred form of vial tube. Fig. 8 is a view in side elevation of the novel push button. Fig. 9 is a sectional view taken along the line 9—9 of Fig. 8. Fig. 10 is a detail view in perspective of the several parts which make up the push button.

Referring to the drawings in which similar reference numerals designate corresponding parts throughout the several views, the level includes a body 15 composed of a number of laminations as illustrated in Fig. 2, although it is to be understood that the material used and the precise construction employed in the body may be altered, consistent with the use to which the level is to be subjected.

The level illustrated in Fig. 1 includes the end leveling devices 16 which allows the level to be used in the capacity of a plumb and the central leveling device 17 used for the finding of grades, leveling, and lateral beveling. Each leveling device includes a vial supporting member or sleeve 21 which is inserted within a suitable opening 18 extending through the level body. The opening has the inwardly projecting spaced lugs 19 which are provided with the countersunk sides 20 as illustrated in Fig. 4, allowing the holding or cover plates 25 to rest flush with the sides of the level body. The sleeve 21 is provided adjacent its extremities with the internal annular grooves 22 which define the spaced shoulders 23. The extremities of these grooves are internally threaded as at 26 and are engaged by the depending and externally threaded flanges 27 of the holding plates. These flanges in conjunction with the shoulders 23 define the annular recesses 28 in which suitable packing 29 is disposed for the reception and protection of the edges of the lenses 30. The lenses 30 in addition to magnifying the readings of the vial tube 31 disposed within the sleeve also protect the same from injury and maintain the compartment, so defined, free from dust and foreign material.

The vial tube 31 which extends diametrically across the compartment included between the lenses and internal of the sleeve 21, is held against shifting with respect thereto and supported in a rigid manner by the externally threaded nipples 32 which are slidably mounted within the openings 33 formed in the side walls of the sleeve 21. Suitable rubber gaskets 34 are inserted within the nipples and acting in conjunction with the cork end piece 35 and cotton packing 36 engage the extremities of the vial tube and support the same in a rigid manner, and at the same time provide for the unequal expansion of the glass and metallic mountings. Suitable caps 38 engage the ends of the nipples and acting in conjunction with the retaining rings 39, rigidly lock the nipples against accidental displacement.

A locking angle member 40 is rigidly secured to the vial supporting sleeve and, as illustrated in Fig. 1, is provided with the slotted extremity 41 which is engaged by the set screw 42, projecting through one of the cover plates 25 and thus rigidly holding the vial against movement with respect to the level body. It has been found in practice that after using the level for a considerable period of time, there always exists the likelihood of the vial tube becoming shifted from its true position, and in order that this may be corrected and adjusted, the sleeve is provided with a number of gear teeth 43 meshing with which is the pinion gear 44 carried by and rigidly secured to the set screw 45. This set screw extends through the cover plate 25 and thus provides for the adjustment of the vial tube, without removing the holding plates 25 or the lenses 30.

The specific form of the vial tube is illustrated in its preferred form in Fig. 7 wherein it will be observed that the walls of the vial tube are symmetrically convex with relation to the longitudinal median line, so that with the axis or longitudinal median line of the vial tube horizontal, or nearly so, the uppermost surface of the tube will be upwardly or outwardly convex and thus allow the vial tube to be successfully used or to successfully perform its requisite functions. The cross sectional contour of the tube will therefore be circular which allows the tube to be graduated in a transverse or lateral manner as at 46, the edges of the vial bubble thus indicating the lateral bevel or twist of an object.

A somewhat modified form of tube is illustrated in Figs. 6 and 6ª in which the upper and lower walls of the tube are outwardly convexed, allowing the vial tube to be used in either of its two positions. The side walls 47 are plane which increases the facility with which the vial readings may be made. The vial tubes are nearly filled with some suitable non-freezing liquid.

The somewhat modified form of leveling device illustrated in Fig. 5 is modified, to the extent only, that the inwardly extending flanges 26' are not threaded and therefore do not so engage the sleeve 21'. The cover or holding plates 25' are rigidly anchored to the inwardly projecting and segmental lugs 19 by means of the anchoring screws 48 to thus securely hold the said plates against movement and provide for the forced rotation of the vial supporting sleeve 21' through the instrumentality of the gear 44 and the teeth 43 formed upon the sleeve 21'. In order to illuminate the compartment defined by the vial supporting sleeve and glass side walls or lenses 30, in which compartment the vial tube is located, an electric bulb 49 is provided and threadedly engages the socket 50 provided therefor which extends through an opening within the sleeve. The base 51 of the lamp projects a considerable distance beyond the vial supporting sleeve and slidably contacts with the metallic plate 52 clearly illustrated in Fig. 1, allowing the sleeve to be rotated, through a limited arc without interfering with the supplying of an electric current to the lamp for its illumination. Inasmuch as each leveling device is adapted to be utilized with the longitudinal axis of the vial tube extending parallel or at right angles to the longitudinal axis of the level body, a plurality of the plates 52 are provided intermediate the spaced segmental lugs 19, thus providing for the energizing of the electric lamp in its various positions. The said plates are of arcuate contour, providing for the constant electrical connection between the base of the lamp during such motion as is imparted to the sleeve during the adjustment of the vial tube through the instrumentality of the gear 44.

An electric battery or source of energy 53 is positioned within an opening 54 provided in the end of the level body and is so held by the end plate 55. Referring now to the level disclosed in Fig. 1, the electric conducting strip 56 extends along the interior of the level body, is electrically connected to one pole of the battery 53 and connects with the electric push buttons A by means of the various branch strips 57. An electric connection is established between the push button A and the metallic portions of the vial tube support, which in turn communicates, in an electric sense, with each electric bulb or lamp. The remote pole of the battery is connected, by means of an electric conducting strip 58 with the contacting plate 52 of each leveling device opening 18. Thus the lamp of each leveling device is independently controlled by its own push button and may be thus independently and separately illuminated. The construction of these push buttons A is illustrated in detail in Figs. 8, 9 and 10, wherein it will be apparent that they include a casing 60 through the bottom plate of which extends the aperture 61. A holding member 62 is positioned beneath and in contact with the lower plate of the casing and has the resilient holding prongs 63 projecting therefrom which are adapted to engage the material in which the push button is to be secured, thus allowing the push button to be driven into wood or allied material and securely held in such position, it being noted that a restricted aperture or opening is first formed therefor, the side walls of which the prongs 63 are adapted to engage.

An insulated block 64 is secured to the bottom plate of the casing by means of the rivet 65, which latter also extends through the holding member 62 and locks the mentioned elements in rigid relation. A plunger 66 projects through the alined openings of the insulating block, holding member and casing and is normally maintained in an elevated position by the spring 67 which contacts with the bottom wall of the casing and impinges, at its upper extremity, upon the finger engaging member 68. The lower extremity of the plunger is provided with the enlarged head 69 preventing the detachment of the plunger and also forming a contacting member, establishing an electric connection between the spring members 70. These spring members are anchored in place upon the block 64 by means of suitable screws 71 projecting through the apertures 72 provided therein. The spring members include the spring terminal contacting arms 73 which project above the opening within the insulating block and therefore in the path of motion of the plunger head 69 which contacts with and establishes an electric connection therebetween. In order that the electric conduits or wires may be easily and quickly secured to the spring contacting members 70, the terminal members 74 are provided, formed of resilient material and may partake the nature of coiled springs as disclosed in Fig. 9 or leaf springs as disclosed in Fig. 8. These terminal members of resilient characteristics are adapted to bear upon the electric conducting strips and affect an electric connection therewith.

It is to be noted that the level illustrated in Fig. 1 has three of the leveling devices and three push buttons and coacting electric circuits, but the number and arrangement thereof may be varied to suit the use to which the implement is to be put. The central leveling device illustrated in Fig. 1 has the opening 79 extending through the level body, the upper portion of which is closed by the glass lens 80, thus magnifying those parts lying therebelow. The vial supporting sleeve 21 is provided with the slot 81 extending therethrough corresponding to and registering with the opening 79, thus rendering the vial tube visible through the lens 80. A similar equipment is provided at 82 below the vial tube, allowing the same to be read from either thereabove or therebelow. It will thus be apparent that the central vial tube is visible from the four sides and readings may be either taken as to the tilting of the longitudinal axis of the vial tube or the twisting thereof.

The body of the level being usually made of wood or some allied destructible material, there are provided the protecting metallic plates 83 securely anchored to the body by the holding screws or allied means 84. The number and relative disposition of the plates depends upon the dimensions of the level body and three have been illustrated in the present drawings upon the upper and lower edges of the level body. These plates being countersunk within the body edges do not mar the appearance thereof nor form protrusions likely to catch in any object, but provide base plates whereby the level will always rest flatly and correctly upon an object to be leveled or plumbed or whose position is to be determined by the vial tube readings.

Having thus fully described my invention, what I claim is:—

1. A vial for leveling instruments, comprising a transparent tube with the upper and lower walls thereof longitudinally convexed in an outward manner with relation to the longitudinal median line, and with plane side walls.

2. A vial tube mounting for levels, comprising a rotatably mounted sleeve, means for locking the same in adjusted positions, means engaging said sleeve for rotating the same through minute arcs, and diametrically arranged means projecting through the side walls of said tube adapted to engage and support the remote ends of a vial tube.

3. A vial tube mounting for levels, comprising a rotatably mounted sleeve, means for locking the same in adjusted positions, means engaging said sleeve for rotating the same through minute arcs, and diametrically arranged means projecting through side walls of said tube adapted to engage and support the remote ends of a vial tube in an expansible manner.

4. A vial tube mounting comprising a sleeve, apertured plates engaging the remote extremities of said sleeve, and means carried by one of said plates engaging said sleeve adapted to rotate the same with relation to said plates, and means carried by said sleeve for securing a vial tube therein.

5. A vial mounting for leveling and allied instruments, comprising a sleeve with annular grooves adjacent its extremities, means mounted upon opposite sides of and projecting through the side walls of the sleeve adapted to support a vial tube therebetween, transparent means located within said sleeve annular grooves, and holding plates engaging said sleeve adjacent the extremities thereof, adapted to anchor said sleeve to a supporting structure and confining said transparent plates within said grooves.

6. A vial mounting for leveling and allied instruments, comprising a sleeve with annular grooves adjacent its extremities, means mounted upon opposite sides of and projecting through the side walls of the sleeve adapted to support a vial tube therebetween, transparent means located within said sleeve annular grooves, holding plates engaging said sleeve adjacent the extremities thereof, adapted to anchor said sleeve to a supporting structure and confining said transparent plates within said grooves, and coacting means carried by said sleeve and said holding plates providing for their manual relative rotation.

7. A mounting for vial tubes, comprising a supporting member, nipples slidably projecting through the side walls thereof, resilient tubelike members positioned within said nipples, a cap threadedly engaging the externally projecting extremities of said nipples and closing the end walls thereof, and internally threaded rings engaging the adjacent extremities of said nipples, and coacting with the caps rigidly and adjustably locking said nipples in their proper and respective relation.

8. A mounting for vial tubes, comprising a supporting member, nipples slidably projecting through the side walls thereof, resilient tube-like members positioned within said nipples, a cap threadedly engaging the externally projecting extremities of said nipples and closing the end walls thereof, internally threaded rings engaging the adjacent extremities of said nipples and coacting with the caps rigidly and adjustably locking said nipples in their proper and respective relation, and outwardly dished annular plates engaging the remote extremities of said supporting member adapted to lock the same to a supporting structure.

9. A vial tube mounting, comprising an open-ended sleeve, annular plates engaging the remote extremities adapted to secure the same to a supporting structure, means carried by one of said plates engaging said sleeve adapted to adjustably rotate the same with relation thereto, and means carried by said plate and sleeve adapted to lock the same in adjusted positions.

10. A vial tube mounting, comprising an open-ended sleeve, annular plates engaging the remote extremities adapted to secure the same to a supporting structure, means carried by one of said plates engaging said sleeve adapted to adjustably rotate the same with relation thereto, means carried by said plate and sleeve adapted to lock the same in adjusted positions, and illuminant means carried by and projecting through said sleeve for the illumination of the interior thereof.

11. A vial tube mounting, comprising an open-ended sleeve, annular plates engaging the remote extremities adapted to secure the same to a supporting structure, means carried by one of said plates engaging said sleeve adapted to adjustably rotate the same with relation thereto, means carried by said plate and sleeve adapted to lock the same in adjusted positions, illuminant means carried by and projecting through said sleeve for the illumination of the interior thereof, and transparent plates projecting across and closing the ends of said sleeve, and means carried by the side walls of said sleeve adapted to support a vial tube therebetween.

12. A vial tube mounting, comprising an open-ended sleeve, annular plates engaging the remote extremities adapted to secure the same to a supporting structure, means carried by one of said plates engaging said sleeve adapted to adjustably rotate the same with relation thereto, means carried by said plate and sleeve adapted to lock the same in adjusted positions, illuminant means carried by and projecting through said sleeve for the illumination of the interior thereof, transparent plates projecting across and closing the ends of said sleeve, means carried by the side walls of said sleeve adapted to support a vial tube therebetween, and means for effecting a sliding electric connection with said illuminant means.

13. A level comprising a body with right angularly disposed apertures projecting therethrough, an open-ended sleeve rotatably mounted within one of said apertures, said sleeve provided with restricted slots adapted to register with the other of said body apertures, and a longitudinally and transversely graduated vial tube mounted within said sleeve and visible through the said body apertures.

14. A level comprising a body with right angularly disposed apertures projecting therethrough, an open-ended sleeve rotatably mounted within one of said apertures, said sleeve provided with restricted slots adapted to register with the other of said body apertures, a longitudinally and transversely graduated vial tube mounted within said sleeve and visible through the said body apertures, and means carried by said body coacting with said sleeve for the relative rotation thereof.

15. A level comprising a body with right angularly disposed apertures projecting therethrough, an open-ended sleeve rotatably mounted within one of said apertures, said sleeve provided with restricted slots adapted to register with the other of said body apertures, a longitudinally and transversely graduated vial tube mounted within said sleeve and visible through the said body apertures, means carried by said body coacting with said sleeve for the relative rotation thereof, and locking means carried by said sleeve and body adapted to hold the sleeve and vial tube in rigid and adjusted positions.

16. A level comprising a body, an aperture projecting therethrough, a rotatably mounted vial carrying sleeve located therein, holding plates rotatably engaging said sleeve and anchored to the said level body, and coacting interengaging means carried by said sleeve and holding plates providing for their relative rotation.

17. A level comprising a body, an aperture projecting therethrough, a rotatably mounted vial carrying sleeve located therein, holding plates rotatably engaging said sleeve and anchored to the said level body, coacting interengaging means carried by said sleeve and holding plates providing for their relative rotation, and outstanding means carried by said sleeve engaging one of said cover plates adapted to rigidly lock the same in adjusted relative positions.

18. A level comprising a body, an aperture projecting therethrough, a rotatably mounted vial carrying sleeve located therein, holding plates rotatably engaging said sleeve and anchored to the said level body, coacting interengaging means carried by said sleeve and holding plates providing for their relative rotation, and transparent end plates carried by said sleeve housing the vial tube therebetween.

19. A level comprising a body, a source of electric energy disposed therein, a leveling device carried by body, a vial tube containing sleeve rotatably carried by said body, transparent end plates carried by said sleeve and rendering the interior thereof visible, means carried by the level body and the said sleeve for effecting their relative rotation and locking the same in adjusted positions, an electric circuit including a push button connecting said source of electric energy and said push button, an electric bulb projecting through the side walls of said sleeve and rotated therewith, and an arcuated plate effecting a sliding electrical connection with said bulb and electrically connected to and included in the electric circuit of said source of electrical energy.

DANIEL W. L. FRANK, Sr.

Witnesses:
LEROY D. CLIFF,
SAM ROSENTHAL.